3,423,439
PROCESS FOR THE PREPARATION OF STEROIDS

John A. Edwards, Palo Alto, Calif., assignor to Syntex Corporation, Panama, Panama, a corporation of Panama
No Drawing. Filed Sept. 2, 1966, Ser. No. 576,868
U.S. Cl. 260—397.45                    6 Claims
Int. Cl. C07c *169/10;* C07c *169/08*

This invention relates to a novel process for the preparation of organic compounds.

In particular, the invention appertains to a process for the preparation of $\Delta^{9(11)}$-estrone from estra-4,9-diene-3,17-dione.

$\Delta^{9(11)}$-estrone is known to possess estrogenic activity and it is an intermediate for the preparation of 9 and/or 11 substituted steroids, such as $9\alpha,11\beta$-dichloro-$3\beta$-hydroxyestra-1,3,5(10)-trien-17-one.

The process of the present invention is practiced by treating the starting material, estra-4,9(10)-diene-3,17-dione, with at least a molar equivalent, and preferably an amount greater than a molar equivalent, of 2,3-dichloro-5,6-dicyano-1,4-benzoquinone in a non-aqueous, inert organic solvent, or mixtures of such solvents, like hydrocarbons, such as benzene, xylene, heptane, ethers, such as dioxane, tetrahydrofuran, and diglyme. Any amount, greater than a molar equivalent, of 2,3-dichloro-5,6-dicyano-1,4-benzoquinone can be used.

The process is performed under dry conditions at temperatures ranging from about 10° C. to about 200° C., conveniently at the reflux temperature of the particular solvent or solvents used. The amount of time required for the process will naturally depend upon several factors, such as temperature, the amount of 2,3-dichloro-5,6-dicyano-1,4-benzoquinone used, the solvent or solvents used, etc. Generally the reaction is completed within a period ranging from about 4 hours to about 50 hours, although shorter periods or longer periods may be used.

The product can be isolated by conventional techniques. For example, the mixture is filtered after cooling and evaporated to dryness. The remaining material is dissolved in acetone, chromatographed through alumina and then precipitated out of the solution upon the careful addition of hexane. The resulting $\Delta^{9(11)}$-estrone can be recrystallized from methylene chloride:ether or acetone:hexane, if desired.

This process is not limited to producing $\Delta^{1,3,5(10),9(11)}$-estrane from estra-4,9-diene-3,17-dione. Other 3-keto-$\Delta^{4,9}$-steroids of the estrane series may be utilized in the process to produce the corresponding $\Delta^{1,3,5(10),9(11)}$-estranes. For example, $17\alpha$-vinyl-$17\beta$-hydroxyestra-4,9-dien-3-one, $17\alpha$-ethyl-$17\beta$-caproxyestra-4,9 - dien - 3 - one, and $17\alpha,17\beta$ - ethylenedioxyestra - 4,9 - dien-3-one are typical steroids that may be employed in the process.

In order that those skilled in the art can more fully understand the present invention, the following examples are set forth. The examples are intended to merely illustrate the present invention and in no way should they be construed as expressing limitations of the present invention.

EXAMPLE 1

A mixture of 0.5 g. of estra-4,9-diene-3,17-dione, 10 ml. of dioxane, and 0.35 g. of 2,3-dichloro-5,6-dicyano-1,4-benzoquinone is refluxed for 10 hours. The mixture is then cooled, filtered, and evaporated to dryness. The residue is dissolved in acetone and this solution is then filtered through 10 g. of alumina and concentrated to yield $3\beta$-hydroxyestra-1,3,5(10),9(11)-tetraen-17-one, which is further purified by recrystallization from acetone:hexane.

EXAMPLE 2

To a solution of 300 ml. of benzene and 27 g. (0.1 mole) of estra-4,9-diene-3,17-dione, 45 g. (0.2 mole) of 2,3-dichloro-5,6-dicyano-1,4-benzoquinone is added. The mixture is refluxed for 18 hours under dry conditions, then cooled and evaporated to dryness. The remaining material is taken up in acetone, filtered, and chromatographed on a 12.5 × 125 cm. silica gel column to yield 3-hydroxyestra-1,3,5(10),9(11)-tetraen-17-one.

EXAMPLE 3

Five thousand and four hundred milligrams (20 mmoles) of estra-4,9(10)-diene-3,17-dione are added to a solution consisting of 22.7 g. (100 mmoles) of 2,3-dichloro-5,6-dicyano-1,4-benzoquinone, 50 ml. of dioxane and 50 ml. of benzene. The mixture is refluxed for 72 hours under dry conditions, then cooled and evaporated to dryness under vacuum. The product and residue are dissolved in ether and the $3\beta$-hydroxyestra-1,3,5(10)9(11)-tetraen-17-one is separated by chromatography on alumina and recrystallized from acetone:hexane after the ether is evaporated off.

EXAMPLE 4

Three grams of $17\alpha$-methyl-$17\beta$-hydroxyestra-4,9-dien-3-one are added to a solution of 2.1 g. of 2,3-dichloro-5,6-dicyano-1,4-benzoquinone and 75 ml. of dioxane. The mixture is refluxed for 12 hours, then cooled, filtered and evaporated to dryness. The remaining residue is taken up in acetone and chromatographed to yield $17\alpha$-methylestra-1,3,5(10),9(11)-tetraene-$3\beta,17\beta$-diol.

What is claimed is:
1. A process for the preparation of a 3-hydroxy-$\Delta^{1,3,5(10),9(11)}$-steroid of the estrane series which comprises treating a corresponding 3-keto-$\Delta^{4,9}$-steroid with at least a molar equivalent of 2,3-dichloro-5,6-dichloro-1,4-benzoquinone.
2. A process according to claim 1 wherein a 3-hydroxy-$\Delta^{1,3,5(10),9(11)}$-steroid is $\Delta^{9(11)}$-estrone and the corresponding 3-keto-$\Delta^{4,9}$-steroid is estra-4,9-diene 3,17-dione.
3. A process according to claim 1 wherein the process is carried out at a temperature ranging from about 10° C. to about 200° C.
4. A process according to claim 1 wherein the process is carried out in a nonaqueous, inert organic solvent.
5. A process according to claim 1 wherein the process is carried out with molar excesses of 2,3-dichloro-5,6-dicyano-1,4-benzoquinone.
6. A process according to claim 1 wherein the 3-keto-$\Delta^{4,9}$-steroid is estra-4,9-diene-3,17-dione which is treated with an amount, greater than a molar equivalent, of 2,3-dichloro-5,6-dicyano-1,4-benzoquinone in a nonaqueous, inert organic solvent at a temperature ranging from about 10° C. to about 200° C. for a period of time ranging from about 4 hours or less to 50 hours or more.

No references cited.

HENRY A. FRENCH, *Primary Examiner.*

U.S. Cl. X.R.
260—397.5, 239.55